Oct. 10, 1961  C. E. FLOWERS  3,003,425
PUMP WITH PRESSURE LOADED BUSHINGS
Filed Jan. 14, 1960  2 Sheets-Sheet 1

INVENTOR.
Charles E. Flowers
BY
His Attorney

United States Patent Office 3,003,425
Patented Oct. 10, 1961

3,003,425
PUMP WITH PRESSURE LOADED BUSHINGS
Charles E. Flowers, Dayton, Ohio, assignor to General Motors Corporation, Detroit, Mich., a corporation of Delaware
Filed Jan. 14, 1960, Ser. No. 2,384
4 Claims. (Cl. 103—126)

This invention relates to pressure loaded fluid displacement pumps, and particularly to a pressure loaded gear pump.

In pumps of the general type disclosed in the Wichorek Patent 2,472,031, wherein a pumping seal is maintained between the faces of the gears and the bushings by means of the fluid pressure generated by the pump, any substantial leakage from the high pressure side to the low pressure side renders the pump inoperative to perform its intended function. The present invention relates to an improvement in pumps of the aforesaid type for maintaining a pumping seal between the bushings and the faces of the gears throughout 360°. Accordingly, among my objects are the provision of means for maintaining the bushings in sealing engagement with the faces of the gears in a pressure loaded pump; and the further provision of a bushing construction designed to compensate for the hydraulic couple forces to which the bushings are subjected during operation of the pump so as to maintain a pumping seal between the faces of the bushings and the faces of the gears.

The aforementioned and other objects are accomplished in the present invention by tapering the faces of the bushings so that the bushings will sealingly engage the faces of the gears during operation of the pump. Specifically, the present invention relates to a pump construction comprising a housing having an inlet and an outlet communicating with a pumping chamber. A pair of gears having oppositely extending spindles are journalled in bushings within the housing. One set of bushings is fixed and the other set of bushings is preloaded by springs and loaded by the fluid pressure generated by the pump.

It is well recognized that during the manufacture of pumps of the aforesaid type it is necessary to provide clearance between the housing, or pump body, and the bushings. Furthermore, since the entire annular end face of one set of bushings is loaded by pressure generated by the pump while only a portion of the annular sealing faces are subjected to outlet pressure, the bushings are subjected to a hydraulic couple during operation of the pump which causes the bushings to tilt. More particularly, the pressure loaded bushings reacting through the gears tilt the normally fixed bushings, and the pressure loaded bushings and the fixed bushings tilt in opposite directions. This tilting of the bushings relative to the pump housing during pumping operation results in an ineffective pump seal between the faces of the bushings and the faces of the gears. When this condition exists, the leakage between the high pressure side and the low pressure side of the pump becomes substantial and the pump is rendered virtually useless for high pressure operation.

According to the present invention, the annular sealing faces of the bushings are ground at an angle to the faces of the gears, which angle compensates for the tilting of the bushings relative to the pump body, or housing, during pumping operation. In this manner, the hydraulic couple tilts the pressure loaded bushings, and the normally fixed bushings which are loaded by reaction forces, are also tilted relative to the pump body so as to maintain the annular sealing faces of the bushings in the plane of the gear faces so as to result in an effective face to face sealing throughout 360°. The bushing construction of this invention can be used with new pumps or the bushings of used pumps can be modified so as to render the pump operative to perform its intended functions.

Further objects and advantages of the present invention will be apparent from the following description, reference being had to the accompanying drawings wherein a preferred embodiment of the present invention is clearly shown.

Figure 2:
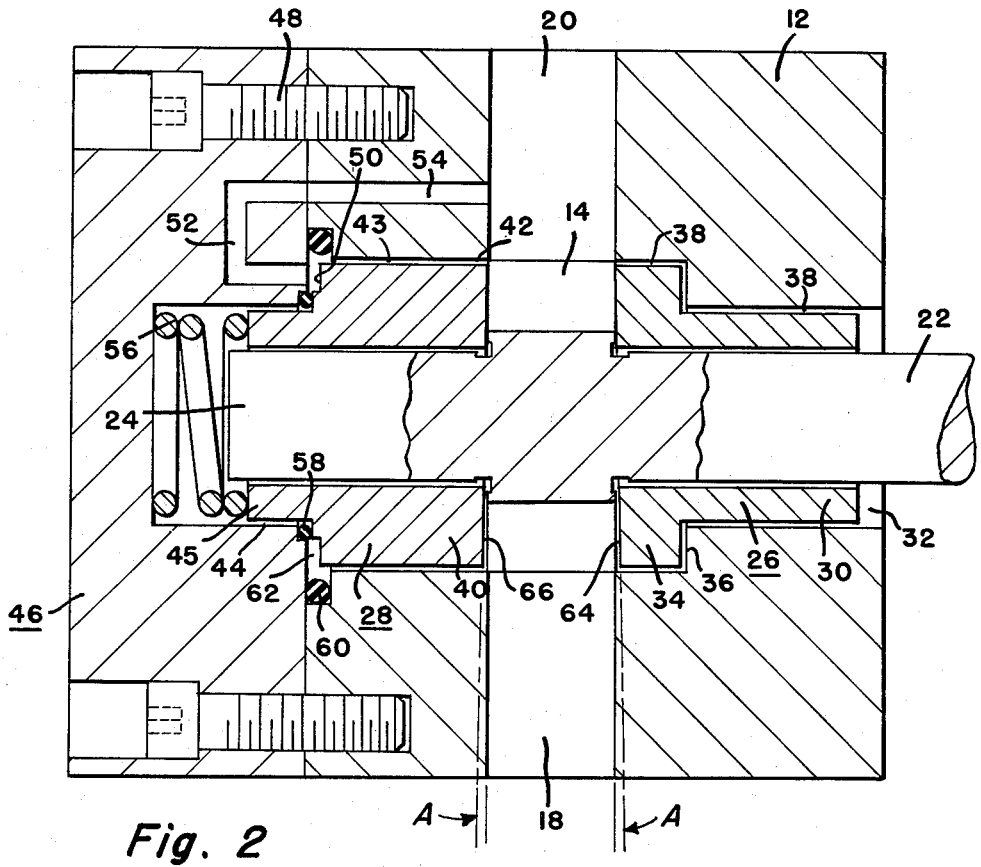
FIGURE 2 is an enlarged sectional view taken along lines 2—2 of FIGURE 1 depicting the relative position of the several parts when the pump is not operating.
Figure 1:
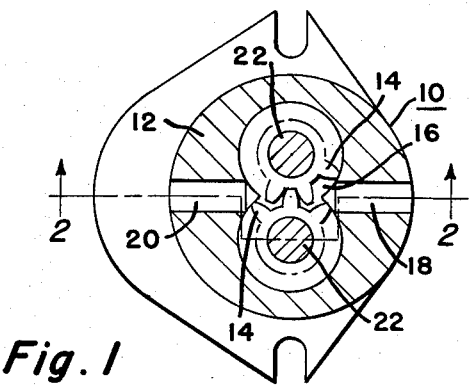
FIGURE 1 is a cross-sectional view of a pump constructed according to the present invention.

With reference to FIGURES 1 and 2, a gear pump 10 is depicted including a housing, or body 12 containing rotary fluid displacement means in the form of intermeshing gears 14. The gears 14 are disposed within a pumping chamber 16 formed within the housing 12, the pumping chamber communicating with an inlet 18 and an outlet 20. As seen particularly in FIGURE 2, each gear 14 is formed with integral spindles 22 and 24 which are rotatably journalled in bushings 26 and 28. Both of the bushings 26 and 28 are of stepped configuration. The bushing 26 has a smaller diameter portion 30 disposed within the bore 32 of the housing 12, and a larger diameter portion 34 engaging a shoulder 36 of the housing. There is a slight annular clearance 38 between the bushing 26 and the housing 12 to facilitate assembly of the bushings therein. The bushing 26 is designated as a normally fixed bushing, since it is not pressure loaded.

The bushing 28 is likewise of stepped configuration and includes a larger diameter portion 40 disposed within a bore 42 of the housing 12 and a smaller diameter portion 45 disposed within a bore 44 of a cover plate 46 attached to the housing 12 by bolts 48. There is likewise a slight annular clearance 43 between the bushing 28 and the housing 12. The surface 50 of the bushing 28 is subjected to the output pressure of the pump and is thus forced to the right, as viewed in FIGURE 2. Pressure is applied to the surface 50 through a passage 52 in the cover 46 and a passage 54 in the housing 12 that communicates with the outlet passage 20. The bushing 28 is also preloaded by a spring 56, suitable O-ring seals 58 and 60 being provided to prevent leakage of fluid from the pressure chamber 62.

Heretofore, it has been customary to grind the faces 64 and 66 of the bushings 26 and 28, respectively, parallel to the faces of the gears so that when the pump is assembled and unloaded, the annular faces 64 and 66 will sealingly engage the faces of the gears 14 throughout 360°. However, as alluded to hereinbefore, since the entire annular area 50 of the pressure loaded bushing 28 is subjected to outlet pressure, while only a portion of the annular surface 66 is subjected to outlet pressure, the bushing 28 is subjected to a hydraulic couple during pumping operation due to the fact that the center of pressure on the sealing surface 66 is displaced from the axis of the bushing 28. This hydraulic couple tends to tilt the bushing 28 in the counterclockwise direction, as viewed in FIGURE 2, by an amount permitted by the clearance 43 between the bushing 28 and the housing 12. This tilting of the bushing 28 causes tilting of the bushing 26 due to reaction forces through the gears 14 as permitted by the clearance 38, and whereas the bushing 28 tilts in the counterclockwise direction, the bushing 26 will tilt in the clockwise direction, as viewed in FIGURE 2.

As will be readily apparent to those skilled in the art, this tilting of the bushings 26 and 28 in opposite directions relative to the gears 14 will render the pumping seal between the faces 64 and 66 of the bushings and the gears 14 ineffective. When this pumping seal is ineffective, there is an inordinate amount of leakage from the outlet 20 to the inlet 18 which renders the pump useless.

In order to obviate this problem, the faces 64 and 66 of the bushings 26 and 28 are taper ground throughout an angle A as indicated in FIGURE 2. The angle is determined by measuring the clearance between the bores in the housing and the bushings, and by knowing the length of the bushings, the amount of possible tilting can be calculated. In a specific pump design of .072 cubic inch displacement, the clearance between the bushings and the housing may be on the order of .001" and the bushings are approximately .800" long. By dividing the clearance by the length of the bushings the tangent of the tilting angle can be determined. For a pump having the dimensions set forth above, it has been determined that the angle A is 0°4'.

Figure 3:
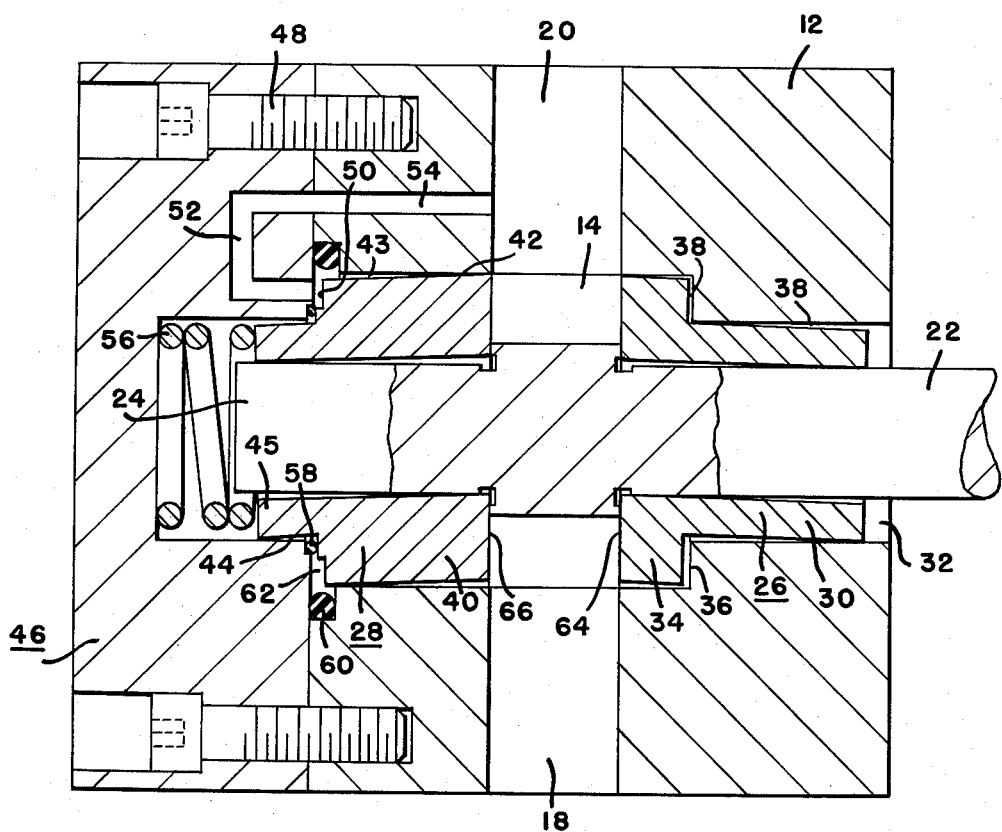
FIGURE 3 is a view similar to FIGURE 2 showing the relative position of the parts when the pump is operating.

With reference to FIGURE 3, when the faces 64 and 66 of the bushings 26 and 28 are taper ground through an angle A, upon pressure loading of the bushing 28, the bushing 28 tilts in the counterclockwise direction so as to maintain annular face 66 in sealing engagement with the gear 14 and the bushing 26 tilts in the clockwise direction so as to maintain annular face 64 in sealing engagement with the face of gear 14. In this manner, an effective pumping seal is maintained throughout the entire surface of the gears thereby preventing inordinate leakage from the outlet to the inlet.

While the embodiment of the invention as herein disclosed constitutes a preferred form, it is to be understood that other forms might be adopted.

What is claimed is as follows:

1. A pump comprising a housing having a pump chamber therein with a fluid inlet in its low pressure side and a fluid outlet in its high pressure side, a rotary fluid displacement member supported within said chamber on a shaft, an axially movable bushing in said housing around said shaft on one side of said rotary member and having a front surface which is in opposed relationship to one face of the rotary member, the fit of said bushing in said housing and around said shaft providing clearances to expedite assembly whereby said bushing is tiltable out of coaxial relationship with the shaft, and means for applying pressure relatively uniformly to the back surface of the bushing while the pump is in operation to thereby urge the front surface of the bushing against the rotary member, said bushing being formed such that the front surface thereof is at an angle to the face of said rotary member when the bushing is in a position coaxial with said shaft, the apex of the angle being on the high pressure side of the chamber and the size of the angle being such that when the pump is operated the tilting of the bushing on the shaft resulting from the pressure differential between the high pressure side and the low pressure side of the pump will effect fluid sealing engagement between the front surface of the bushing and the face of the rotary member.

2. A pump comprising a housing having a pump chamber therein with a fluid inlet in its low pressure side and a fluid outlet in its high pressure side, a flat sided rotary fluid displacement member supported within said chamber on a shaft, an axially movable generally cylindrical bushing in said housing and around said shaft on one side of said rotary member and having a flat front surface which is in opposed relationship to one flat side of the rotary member, the fit of said bushing in said housing and around said shaft providing clearances to expedite assembly whereby the bushing is tiltable out of coaxial relationship with the shaft, a spring biased between the housing and the back surface of said bushing, and means for applying fluid pressure relatively uniformly to the back surface of the bushing while the pump is in operation to thereby urge the flat front surface of the bushing against the rotary member, said bushing being formed such that the front surface thereof is at an angle to the side of said rotary member when the bushing is in a position coaxial with said shaft, the apex of the angle being on the high pressure side of the chamber and the size of the angle being such that when the pump is operated the tilting of the bushing on the shaft resulting from the pressure differential between the high pressure side and the low pressure side of the pump will effect fluid sealing engagement between the flat front surface of the bushing and the flat side of the rotary member.

3. A rotary displacement pump comprising a housing having a pump chamber therein with a fluid inlet in its low pressure side and a fluid outlet in its high pressure side, a rotary fluid displacement member supported within said chamber on a shaft, an axially movable bushing in said housing and around said shaft on each side of said rotary member, each of the bushings having a front surface which is in opposed relationship to a face of the rotary member, the fit of said bushings in said housing and around said shaft providing clearances to expedite assembly whereby said bushings are tiltable out of coaxial relationship with the shaft, and means for applying pressure relatively uniformly to the back surface of at least one of the bushings while the pump is in operation to cause the positions of the bushings relative to each other to move inwardly and thereby urge the front surfaces of the bushings against the rotary member, each of said bushings being formed such that the front surface thereof is at an angle to the opposed face of said rotary member when the bushing is in a position coaxial with said shaft, the apex of the angle being on the high pressure side of the chamber and the size of the angle being such that when the pump is operated the tilting of the bushing on the shaft resulting from the pressure differential between the high pressure side and the low pressure side of the pump will effect fluid sealing engagement between the front surface of the bushing and the opposed face of the rotary member.

4. A rotary displacement pump comprising a housing having a pump chamber therein with a fluid inlet in its low pressure side and a fluid outlet in its high pressure side, a pair of meshing flat sided gears each supported within said chamber on a shaft, each of said gears having a pair of axially movable bushings, one on each side thereof, fitted in said housing and around the shaft of its associated gear, each bushing having a flat front surface which is in opposed relationship to a flat side of its associated gear, the fit of each of said bushings in said housing and around its associated shaft providing clearances to expedite assembly whereby each of said bushings is tiltable out of coaxial relationship with its shaft, and means for applying pressure relatively uniformly to the back surface of at least one of each of said pairs of bushings to cause the relative positions of the bushings in each pair of bushings to shift toward each other and thereby urge the front surfaces of the bushings against the opposed sides of the gears, each of said bushings being formed such that the front surface thereof is at an angle to the opposed side of its associated gear when the bushing is in a position coaxial with its shaft, the apex of the angle being on the high pressure side of the chamber and the size of the angle being such that when the pump is operated the tilting of the bushings on the shafts resulting from the pressure differential between the high pressure side and the low pressure side of the pump will effect fluid sealing engagement between the flat front surfaces of the bushings and the opposed flat sides of the associated gears.

References Cited in the file of this patent

UNITED STATES PATENTS

| | | |
|---|---|---|
| 2,336,294 | Rea | Dec. 7, 1943 |
| 2,420,622 | Roth et al. | May 13, 1947 |
| 2,682,836 | Orr | July 6, 1954 |
| 2,706,452 | Hilton | Apr. 19, 1955 |
| 2,789,512 | Kremser | Apr. 23, 1957 |
| 2,870,718 | Prasse | Jan. 27, 1959 |
| 2,870,719 | Murray et al. | Jan. 27, 1959 |